United States Patent
Veiga

(10) Patent No.: US 6,257,551 B1
(45) Date of Patent: Jul. 10, 2001

(54) VALVE STEM EXTENSION

(75) Inventor: Louie D. Veiga, Nashua, NH (US)

(73) Assignee: Watts Investment Company, Wilmington, DE (US)

(*) Notice: Subject to any disclaimer, the term of this patent is extended or adjusted under 35 U.S.C. 154(b) by 0 days.

(21) Appl. No.: 09/318,877

(22) Filed: May 26, 1999

(51) Int. Cl.[7] .................................................. F16K 31/44
(52) U.S. Cl. ........................ 251/288; 251/292; 251/293; 403/320; 411/383; 411/522
(58) Field of Search .................. 251/293, 292, 251/288; 403/320, 317, 316, 315; 411/383, 522

(56) References Cited

U.S. PATENT DOCUMENTS

| | | | |
|---|---|---|---|
| 972,758 | * 10/1910 | Fifield | 403/320 |
| 1,181,565 | * 5/1916 | Block | 251/293 X |
| 2,198,455 | * 4/1940 | Mueller et al. | 251/293 |
| 2,509,426 | * 5/1950 | Fransen | 251/293 X |
| 3,582,118 | * 6/1971 | Hogan | 411/315 |
| 3,583,427 | * 6/1971 | Tauller | 251/288 |
| 4,109,672 | * 8/1978 | Szemeredi | 403/316 |
| 4,589,629 | * 5/1986 | Gaffney et al. | 251/288 |
| 4,934,654 | * 6/1990 | Linnemann | 251/292 X |
| 5,085,548 | * 2/1992 | Moyles | 411/522 |
| 5,275,200 | * 1/1994 | Yamamoto | 251/288 |
| 5,579,804 | * 12/1996 | Roberts | 251/288 X |
| 5,636,540 | * 6/1997 | Myers | 411/522 |
| 5,954,088 | * 9/1999 | Huang | 251/292 X |

\* cited by examiner

Primary Examiner—Kevin Shaver
Assistant Examiner—John Bastianelli
(74) Attorney, Agent, or Firm—Fish & Richardson P.C.

(57) ABSTRACT

A valve stem extension for extending the length of a valve stem, the valve stem extension including an extension member and a rotation resisting member. The extension member has a first end for engaging the valve stem and defines an opening which exposes two opposing flat sides of the valve stem when the extension member is engaged with the valve stem. The rotation resisting member includes two opposing flat sides and is configured to be insertable within the opening of the extension member after engagement of the extension member with the valve stem. When positioned in the opening of the extension member, the two opposing flat sides of the rotation resisting member engage the two opposing flat sides of the valve stem to resist rotation of the extension member relative to the valve stem.

27 Claims, 5 Drawing Sheets

VALVE STEM EXTENSION

BACKGROUND OF THE INVENTION

The invention relates to a valve stem extension for extending a valve stem.

A typical prior art valve 10, such as a ball valve or plug valve, is illustrated in FIG. 1. Valve 10 includes a valve body 12 defining an inlet 14 and an outlet 16. A ball or plug (not shown) located within body 12 is movable between a first position which blocks flow through valve 10, and a second position which allows flow through valve 10. Attached to the ball or plug and extending from body 12 is a valve stem 18. A packing nut 19 compresses a teflon seal (not shown) underneath nut 19, forming a seal between valve stem 18 and body 12.

The ball or plug is moved by rotating valve stem 18. Valve stem 18 includes two opposing flat sides 24a, 24b, and two opposing circumferential threaded sides 26a, 26b. A handle 20 attached to valve stem 18 is used to rotate valve stem 18. Handle 20 defines an oblong opening 28 which includes two opposing flat sides 30a, 30b for engaging the opposing flat sides 24a, 24b of valve stem 18. A top nut 32 is threaded onto valve stem 18, threadingly engaging the opposing circumferential threaded sides 26a, 26b of valve stem 18, to secure handle 20 to valve stem 18.

Valve body 12 includes rotation limiting flanges 34a, 34b, which define rotation limiting surfaces 35a, 35b. Handle 20 has a stub 36. Rotation of handle 20 is limited by abutment of stub 36 against rotation limiting surfaces 35a, 35b.

SUMMARY OF THE INVENTION

It is often desirable to cover a system of piping with insulation, both to protect the piping and components and to conserve energy. Covering the piping system with insulation can affect access to the valve stem (if the valve is covered). If the valve is left exposed for access to the valve stem, insulation and protection performance can be impaired.

In one aspect, the invention features a valve stem extension for extending the length of a valve stem to permit access to the valve stem. The valve stem extension includes an extension member and a rotation resisting member. The extension member has a first end for engaging the valve stem and defines an opening which exposes two opposing flat sides of the valve stem when the extension member is engaged with the valve stem. The rotation resisting member includes two opposing flat sides and is configured to be insertable within the opening of the extension member after engagement of the extension member with the valve stem. When positioned in the opening, the two opposing flat sides of the rotation resisting member engage the two opposing flat sides of the valve stem to resist rotation of the extension member relative to the valve stem.

Embodiments of this aspect of the invention may include one or more of the following features. The valve stem includes two opposing circumferential threaded sides, and the first end of the extension member includes a threaded bore for threaded engagement with the valve stem. The extension member includes a second end including two opposing flat sides and two opposing circumferential threaded sides. The rotation resisting member is a C-shaped insert, and the opening of the extension member has a corresponding C-shape for receiving the C-shaped insert. The valve stem extension includes a bushing defining a bore for receiving the extension member. An outer housing defines a bore for receiving the extension member. The bushing acts to maintain the rotation resisting member within the opening of the extension member. The outer housing defines an anti-rotation opening and includes upper rotation limiting flanges.

In another aspect, the invention features a valve including a valve body having a flow inlet and a flow outlet. A flow control device is movable between a first position which blocks flow through the valve body and a second position which allows flow through the valve body. A rotatable valve stem is connected to the flow control device for moving the flow control device between the first and second positions. The valve includes a valve stem extension having an extension member and a rotation resisting member. The extension member has a first end for engaging the valve stem and defines an opening which exposes two opposing flat sides of the valve stem when the extension member is engaged with the valve stem. The rotation resisting member includes two opposing flat sides and is configured to be insertable within the opening of the extension member after engagement of the extension member with the valve stem. When positioned in the opening, the two opposing flat sides of the rotation resisting member engage the two opposing flat sides of the valve stem to resist rotation of the extension member relative to the valve stem.

Embodiments of this aspect of the invention may include one or more of the following features. The extension member includes a second end having two opposing flat sides. The valve further includes a valve handle for engaging the second end of the extension member. The valve handle defines an opening including two opposing flat sides for engaging the two opposing flat sides of the second end of the extension member. The valve handle also includes a rotation limiting stub for limiting the rotation of the valve handle, and the valve housing includes a rotation limiting flange. The valve stem extension further includes an outer housing defining an anti-rotation opening for receiving the rotation limiting flange of the valve housing.

In another aspect, the invention features a method for extending a valve stem. The method includes attaching a valve stem extension member to the valve stem. The extension member includes a first end for engaging the valve stem and defines an opening which exposes two opposing flat sides of the valve stem when the extension member is engaged with the valve stem. A rotation resisting member is inserted into the opening of the extension member. The rotation resisting member includes two opposing flat sides for engaging the two opposing flat sides of the valve stem to resist rotation of the extension member relative to the valve stem.

Embodiments of this aspect of the invention may include one or more of the following features. A bushing is placed over the extension member and the rotation resisting member to maintain the rotation resisting member within the opening of the extension member. An outer housing is placed over the bushing. A second end of the extension member is engaged by a valve handle. The second end of the extension member includes two opposing flat sides and the valve handle defines an opening including two opposing flat sides for engaging the two opposing flat sides of the second end of the extension member.

DETAILED DESCRIPTION

Figure 1:
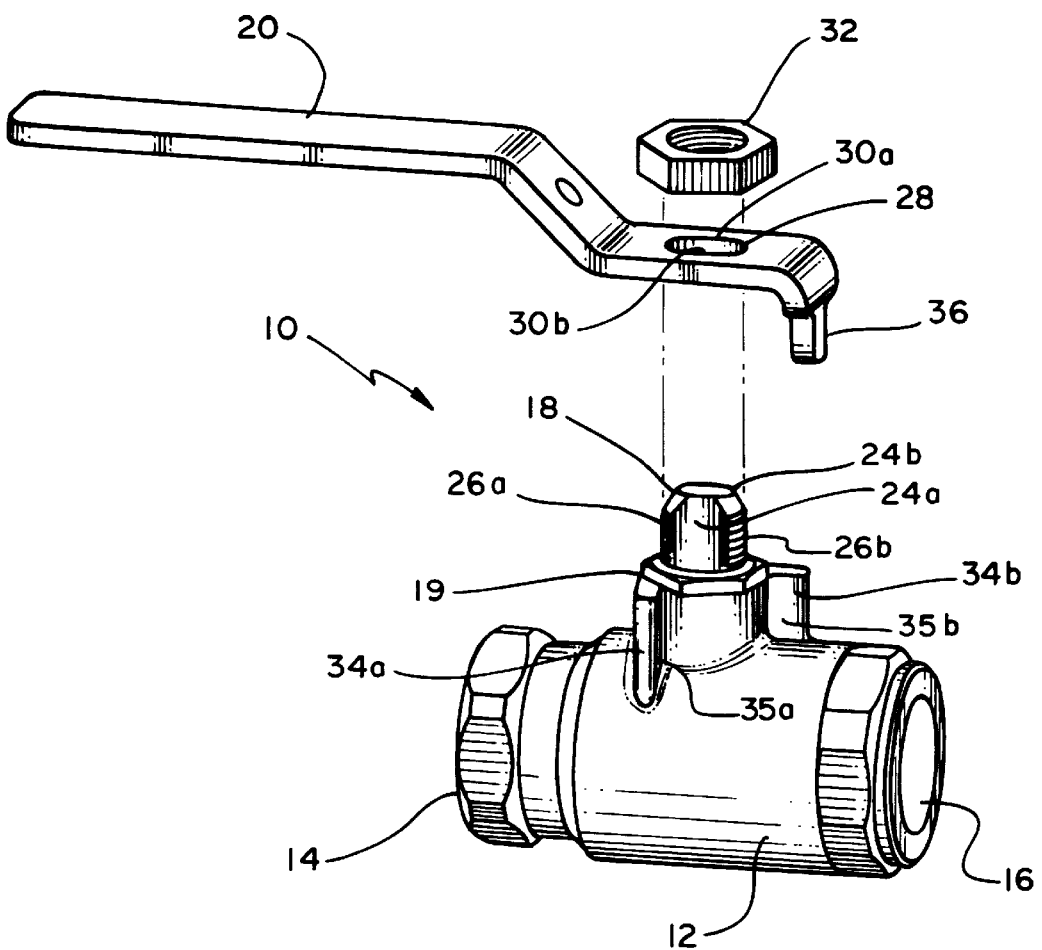
FIG. 1 is a perspective view of a prior art valve.
Figure 2:
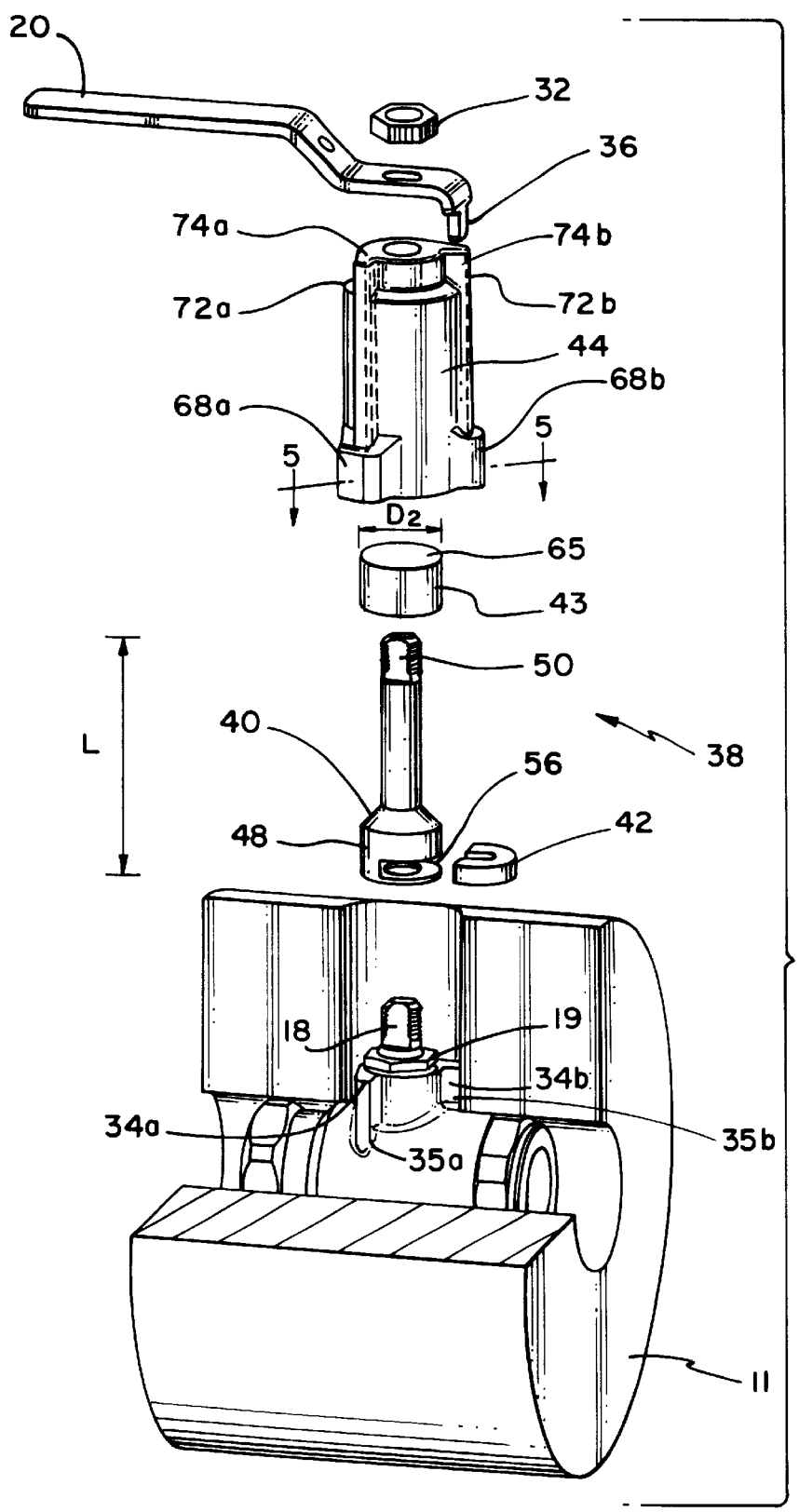
FIG. 2 is an exploded view showing the valve of FIG. 1 including a valve stem extension according to the present invention.

Referring to FIG. 2, valve 10 is shown covered with a sleeve of insulation 11. The thickness of insulation 11 prevents direct access to valve stem 18 by handle 20. In order to rotate valve stem 18, a valve stem extension 38 is provided attached to valve 10. Valve stem extension 38 includes an extension member 40, a C-shaped rotation resisting insert 42, a bushing 43, and an outer housing 44.

Figure 3:
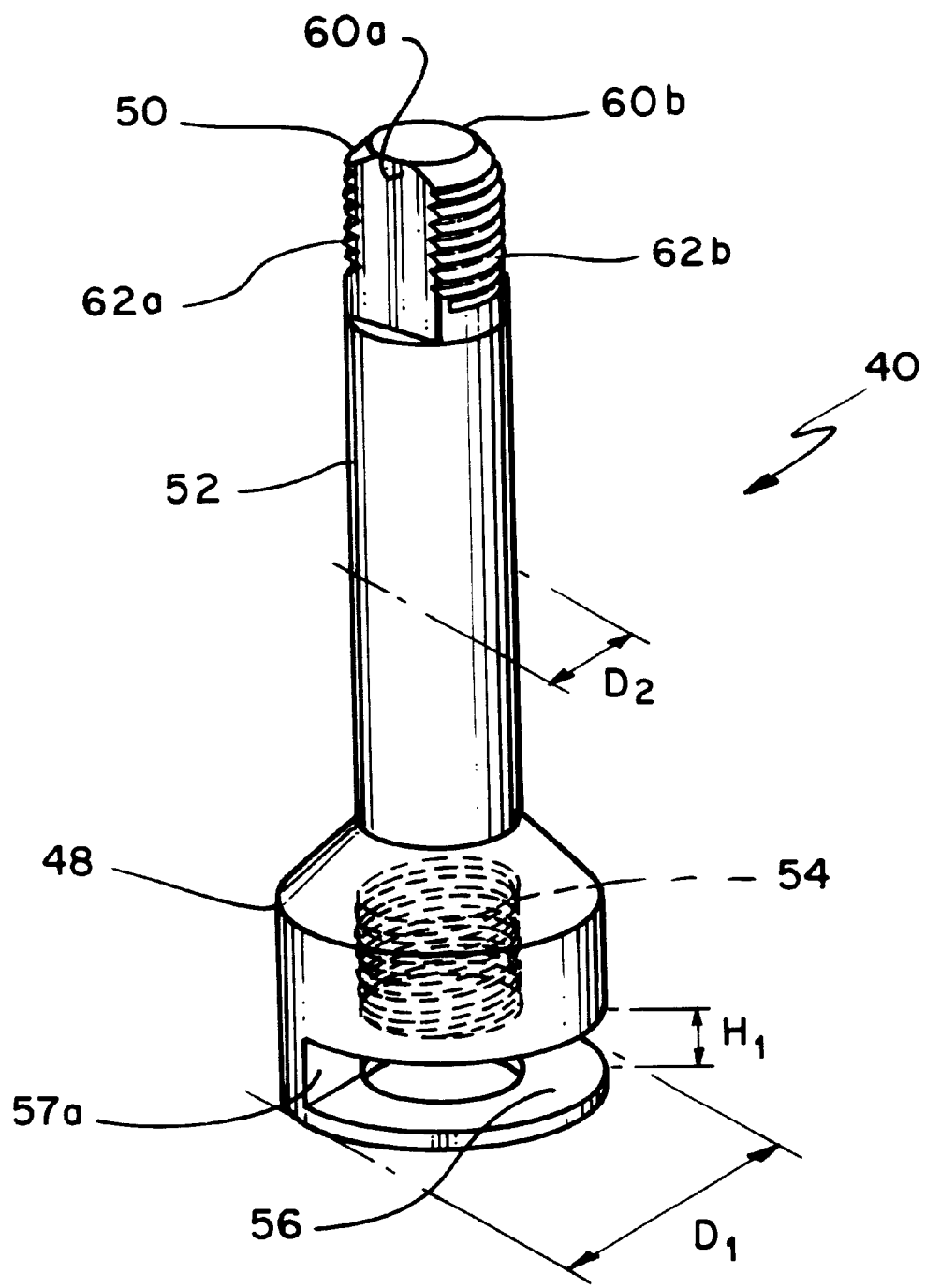
FIG. 3 is a perspective view of an extension member of the valve stem extension of FIG. 2.

Referring to FIG. 3, extension member 40 has a first end 48 for engaging over stem 18, a second end 50 for engaging handle 20, and a middle body portion 52. First end 48 is generally cylindrical in shape and defines a threaded bore 54 for threaded engagement with circumferential threaded sides 26a, 26b of valve stem 18. First end 48 also defines a C-shaped opening 56 flanked by straight walls 57a, 57b (only wall 57a is shown). Opening 56 exposes the two opposing flat sides 24a, 24b of stem 18 when placed over stem 18.

Second end 50 of extension member 40 includes two opposing flat sides 60a, 60b and two opposing circumferential sides 62a, 62b. Opposing flat sides 60a, 60b and circumferential threaded sides 62a, 62b of second end 50 are identical in size and shape to opposing flat sides 24a, 24b and opposing circumferential sides 26a, 26b of stem 18. Middle body portion 52 is generally cylindrical shape, and has a diameter $D_2$, e.g., less than a diameter $D_1$ of first end 48.

Figure 4:
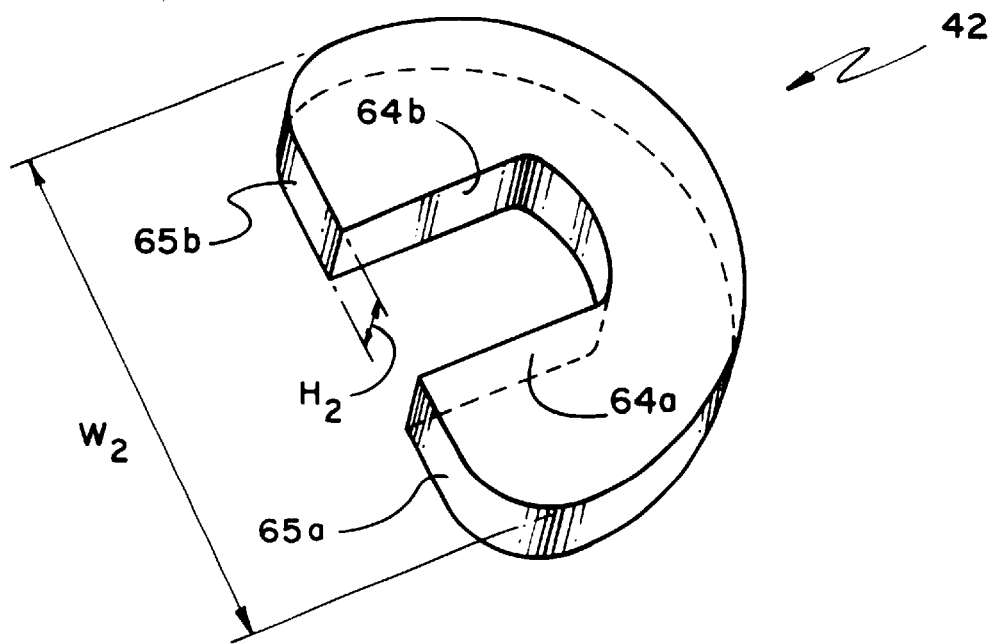
FIG. 4 is a perspective view of a rotation resisting insert of the valve stem extension of FIG. 2.

Referring to FIG. 4, C-shaped insert 42 includes two opposing, internal flat sides 64a, 64b for engaging the exposed flat sides 24a, 24b of stem 18, and two ends 65a, 65b for engaging walls 57a, 57b of first end 48 of extension member 40. Insert 42 has a height $H_2$ which is approximately equal to a height $H_1$ of opening 56, and has a width $W_2$ approximately equal to diameter $D_1$ of first end 48.

Upon insertion into opening 56, insert 42 acts to resist rotation of extension member 40 relative to stem 18. Internal flat sides 64a, 64b of insert 42 engage exposed flat sides 24a, 24b, respectively, of valve stem 18, thereby to resist rotation of steam 18 relative to insert 42. In addition, ends 65a, 65b engage straight walls 57a, 57b of first end 48 of extension member 40, thereby to prevent rotation of extension member 40 relative to stem 18.

Referring again to FIG. 2, bushing 43 is cylindrical in shape, and defines a cylindrical bore 65 for receiving extension member 40. An inner diameter $D_3$ of bushing 43 is approximately equal to width $W_2$ of insert 42. When in place, bushing 43 acts to maintain insert 42 within opening 56.

Figure 5:
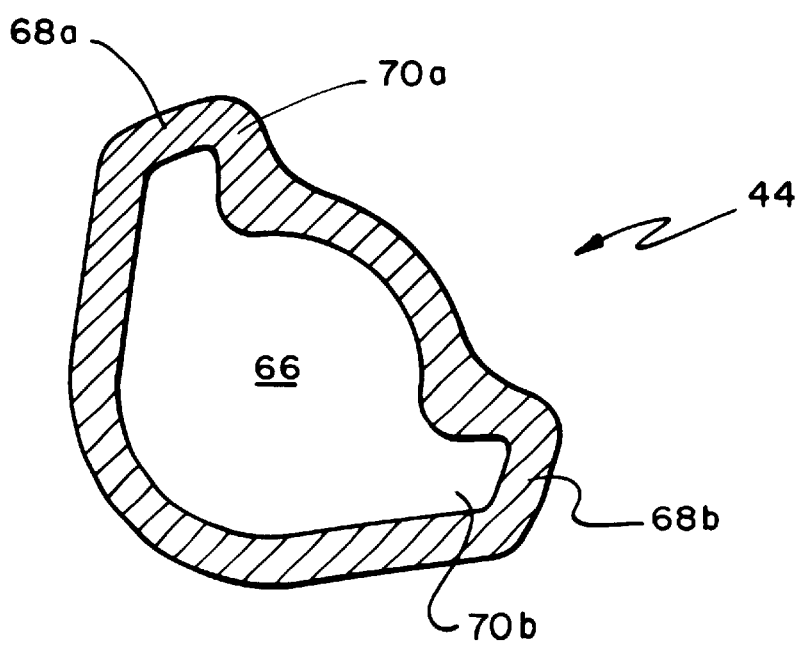
FIG. 5 is a cross-sectional view of an outer housing of the valve stem extension of FIG. 2, taken along the line 5—5 in FIG. 2.

Referring to FIGS. 2 and 5, outer housing 44 is generally cylindrical in shape, and defines a cylindrical internal bore 66 for receiving extension member 40 and bushing 43. Outer housing 44 includes two anti-rotation elements 68a, 68b defining openings 70a, 70b, respectively, for receiving anti-rotation flanges 34a, 34b of valve body 12 when outer housing 44 is placed over extension member 40. Flanges 34a, 34b act to prevent outer housing 44 from rotating relative to extension member 40 when openings 70a, 70b are engaged over flanges 34a, 34b. Outer housing 44 further includes upper rotation limiting flanges 72a, 72b, which define rotation limiting surfaces 74a, 74b in positions corresponding to rotation limiting surfaces 35a, 35b of rotation limiting flanges 34a, 34b on valve body 12. Like surfaces 35a, 35b, upper rotation limiting surfaces 74a, 74b act to limit rotation of handle 20.

A typical valve extension 38 has an overall length L of, e.g., about 2.00 inches. In one embodiment: height $H_1$ of opening 56 is, e.g., about 0.18 inches; diameter $D_1$ of first end 48 is, e.g., about 0.68 inches; diameter $D_2$ of middle body portion 52 is, e.g., about 0.31 inches; height $H_2$ of insert 42 is, e.g., about 0.18 inches; width $W_2$ of insert 42 is, e.g., about 0.68 inches; and inner diameter $D_3$ of bushing 43 is, e.g., about 0.68 inches. In another embodiment: height $H_1$ of opening 56 is, e.g., about 0.18 inches; diameter $D_1$ of first end 48 is, e.g., about 0.77 inches; diameter $D_2$ of middle body portion 52 is, e.g., about 0.38 inches; height $H_2$ of insert 42 is, e.g., about 0.18 inches; width $W_2$ of insert 42 is, e.g., about 0.77 inches; and inner diameter $D_3$ of bushing 43 is, e.g., about 0.77 inches. In a third embodiment: height $H_1$ of opening 56 is, e.g., about 0.25 inches; diameter $D_1$ of first end 48 is, e.g., about 1.09 inches; diameter $D_2$ of middle body portion 52 is, e.g., about 0.56 inches; height $H_2$ of insert 42 is, e.g., about 0.25 inches; width $W_2$ of insert 42 is, e.g., about 1.09 inches; and inner diameter $D_3$ of bushing 43 is, e.g., about 1.09 inches.

Figure 6:
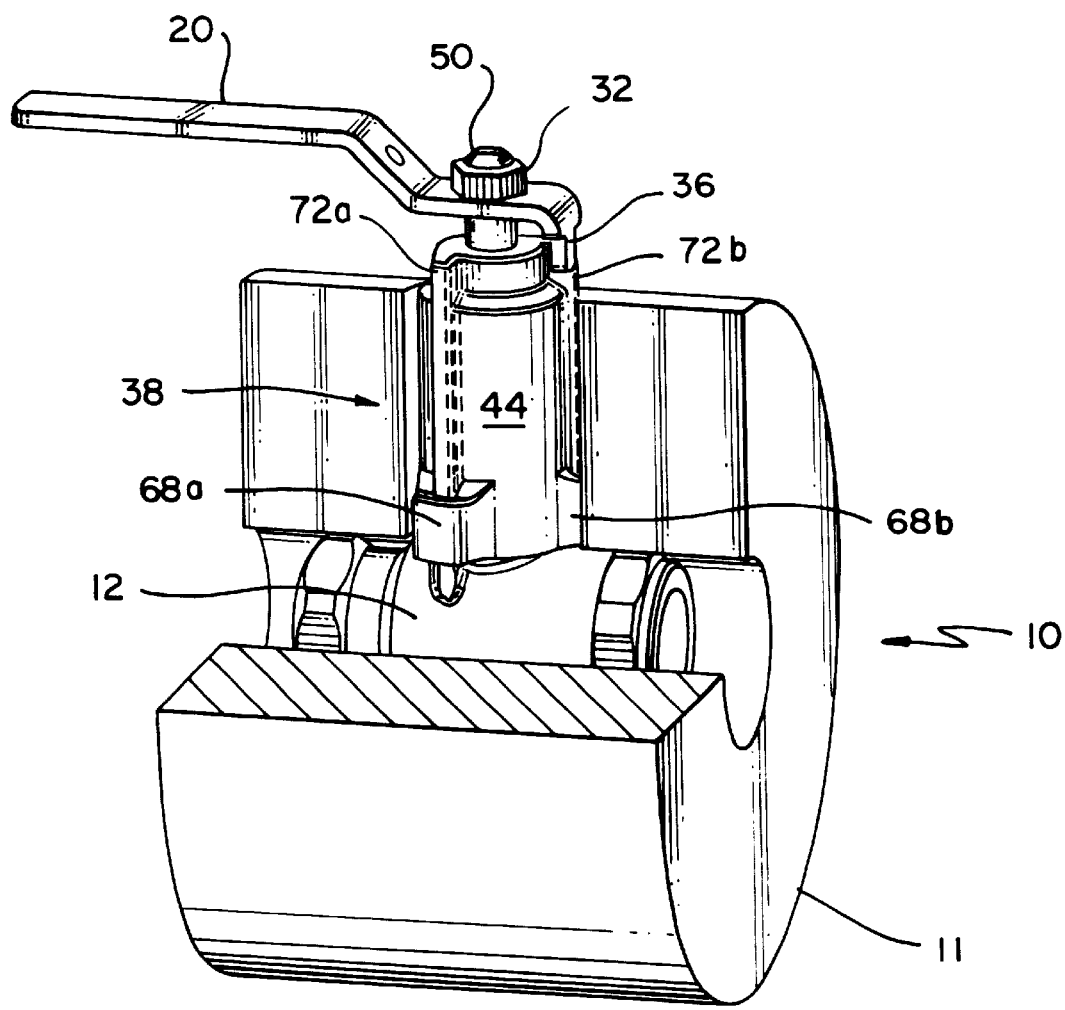
FIG. 6 is a perspective view of the valve and valve stem extension of FIG. 2 shown fully assembled.

Referring to FIGS. 2 and 6, valve extension 38 is attached to valve stem 18 in the following manner. First, nut 32 and handle 20 are removed from valve stem 18. Next, extension member 40 is threadingly engaged over stem 18, such that opening 56 exposes flat sides 24a, 24b of stem 18. C-shaped insert 42 is then inserted into opening 56 of extension member 40, and bushing 43 is placed over extension member 40 and insert 42. Finally, outer housing 44 is placed over extension member 40 and bushing 43, such that anti-rotation openings 70a, 70b engage over anti-rotation flanges 34a, 34b. Bushing 43 acts to maintain insert 42 within opening 56 and to reduce friction between extension member 40 and outer housing 44. Insulation sleeve 11 can then be placed over valve 10.

In operation, handle 20 is secured to second end 50 of extension member 40 with nut 32, with stub 36 between upper rotation limiting flanges 72a, 72b. Once handle 20 is secured, an operator can turn handle 20 between upper rotation limiting surfaces 74a, 74b. Turning handle 20 turns extension member 40, which turns valve stem 18 to move the ball or plug located inside valve body 12 between its open and closed positions.

Other embodiments and modifications are within the scope of the claims. For example, the shape of insert 42 and opening 56 may be modified, so long as insert 42 acts to limit rotation of extension member 40 relative to stem 18 by engaging the opposing flat sides 24a, 24b of stem 18. Extension member 40 may be engaged with valve stem 18 by means other than threaded engagement. For example, valve stem 18 and extension member 40 may have cooperating detent structures rather than threads.

Insert 42 may be maintained within opening 56 by means other than placement of bushing 43 over extension member 40. For example, insert 42 may be held within opening 56 by a strap or a screw. In addition, bushing 43 may be eliminated, and outer housing 44 may act to maintain insert 42 within opening 56.

The dimensions of extension member 40 can be modified to accommodate different sized valves and different sized insulation. For example, middle body portion 52 of extension member 40 can be longer or shorter, depending on the amount of insulation desired. The length of outer housing 44 can be adjusted accordingly. In addition, the dimensions of the remaining components, including dimensions $H_1$, $D_1$, $D_2$, $H_2$, $W_2$, and $D_3$ may be varied.

What is claimed is:

1. A valve stem extension for extending the length of a valve stem, the valve stem including two opposing flat sides, the valve stem extension comprising:

an extension member including a first end for engaging the valve stem, the extension member defining an opening which exposes the two opposing flat sides of the valve stem when the extension member is engaged with the valve stem; and a C-shaped insert including two opposing flat sides, the insert being configured to be insertable within the opening of the extension member after engagement of the extension member with the valve stem such that when positioned in the opening, the two opposing flat sides of the insert engage the two opposing flat sides of the valve stem to resist rotation of the extension member relative to the valve stem.

2. The valve stem extension of claim 1 wherein the valve stem includes two opposing circumferential threaded sides, and the first end of the extension member includes a threaded bore for threaded engagement with the valve stem.

3. The valve stem extension of claim 1 wherein the extension member includes a second end including two opposing flat sides, and two opposing circumferential threaded sides.

4. The valve stem extension of claim 1 further comprising a bushing defining a bore for receiving the extension member, the bushing acting to maintain the rotation resisting member within the opening of the extension member.

5. The valve stem extension of claim 1 further comprising an outer housing defining a bore for receiving the extension member.

6. The valve stem extension of claim 5 wherein the outer housing defines an anti-rotation opening.

7. The valve stem extension of claim 5 wherein the outer housing includes a rotation limiting flange.

8. The valve stem extension of claim 1 wherein the opening has a corresponding C-shape for receiving the C-shaped insert.

9. The valve stem of claim 1 wherein the C-shaped insert is a single member.

10. A valve stem extension for extending the length of a valve stem, the valve stem including two opposing flat sides, and two opposing circumferential threaded sides, the valve stem extension comprising:

an extension member including a first end defining a threaded bore for threaded engagement with the valve stem; and a C-shaped insert engageable with the valve stem for resisting rotation of the extension member relative to the valve stem after threaded engagement of the extension member with the valve stem, the insert including two opposing flat sides for engaging the two opposing flat sides of the valve stem.

11. The valve stem of claim 10 wherein the C-shaped insert is a single member.

12. The valve step of claim 10 wherein the extension member has a second end including two opposing flat sides.

13. A valve comprising:

a valve body having a flow inlet and a flow outlet;

a flow control device movable between a first position which blocks flow through the valve body and a second position which allows flow through the valve body;

a rotatable valve stem connected to the flow control device for moving the flow control device between the first and second positions, the valve stem including two opposing flat sides;

a valve stem extension including:

an extension member having a first end for engaging the valve stem, the extension member defining an opening which exposes the two opposing flat sides of the valve stem when the extension member is engaged with the valve stem; and a C-shaped insert including tow opposing flat sides, the insert being configured to be insertable within the opening of the extension member after engagement of the extension member with the valve stem such that when positioned in the opening, the two opposing flat sides of the engage the two opposing flat sides of the valve stem to resist rotation of the extension member relative to the valve stem.

14. The valve of claim 13 wherein the extension member includes a second end having two opposing flat sides, and the valve further comprises a valve handle for engaging the second end of the extension member, the valve handle defining an opening including two opposing flat sides for engaging the two opposing flat sides of the second end of the extension member.

15. The valve of claim 14 wherein the valve handle comprises a rotation limiting stub for limiting the rotation of the valve handle.

16. The valve of claim 13 wherein the valve stem extension further comprises a bushing defining a bore for receiving the extension member therein, the bushing acting to maintain the rotation resisting member within the opening of the extension member.

17. The valve of claim 13 wherein the valve stem extension further comprises an outer housing defining a bore for receiving the extension member therein.

18. The valve of claim 17 wherein the valve body includes a rotation limiting flange and the outer housing defines an anti-rotation opening for receiving the rotation limiting flange of the valve body.

19. The valve of claim 17 wherein the outer housing includes a rotation limiting flange.

20. The valve of claim 13 wherein the valve body includes a rotation limiting flange.

21. The valve stem of claim 13 wherein the C-shaped insert is a single member.

22. A valve stem extension for extending the length of a valve stem, the valve stem including two opposing flat sides, and two opposing circumferential threaded sides, the valve stem extension comprising:

an extension member including a first end having a threaded bore for threaded engagement with the valve stem, the extension member defining an opening which exposes the two opposing flat sides of the valve stem when the extension member is engaged with the valve stem;

a rotation resisting C-shaped insert, the C-shaped insert including two opposing flat sides and being configured to be insertable within the opening of the extension member after threaded engagement of the extension member with the valve stem such that when positioned in the opening, the two opposing flat sides of the C-shaped insert engage the two opposing flat sides of the valve stem to resist rotation of the extension member relative to the valve stem;

a bushing, the bushing defining a bore for receiving the extension member therein, the bushing acting to maintain the rotation resisting member within the opening of the extension member; and an outer housing, the outer housing defining a bore for receiving the extension member and the bushing.

23. A method for extending a valve stem, the valve stem including two opposing flat sides, the method comprising:

attaching a valve stem extension member to the valve stem, the extension member including a first end for engaging the valve stem and defining an opening which exposes the two opposing flat sides of the valve stem when the extension member is engaged with the valve stem;

inserting a C-shaped insert into the opening of the extension member, the insert including two opposing flat sides for engaging the two opposing flat sides of the valve stem to resist rotation of the extension member relative to the valve stem.

24. The method of claim 23 further comprising the step of placing a bushing over the extension member and the rotation resisting member to maintain the rotation resisting member within the opening of the extension member.

25. The method of claim 24 further comprising the step of placing an outer housing over the extension member and the bushing.

26. The method of claim 23 further comprising the step of engaging a second end of the extension member with a valve handle, the extension member including two opposing flat sides and the valve handle defining an opening including two opposing flat sides for engaging the two opposing flat sides of the second end of the extension member.

27. The valve stem of claim 23 wherein the C-shaped insert is a single member.

* * * * *